(12) United States Patent
Suyama et al.

(10) Patent No.: US 7,562,738 B2
(45) Date of Patent: Jul. 21, 2009

(54) VEHICLE CONTROL APPARATUS

(75) Inventors: Koichi Suyama, Saitama (JP);
Takamitsu Tajima, Saitama (JP);
Yoshinobu Tada, Saitama (JP); Kouichi Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 166 days.

(21) Appl. No.: 11/296,763

(22) Filed: Dec. 7, 2005

(65) Prior Publication Data

US 2006/0118350 A1 Jun. 8, 2006

(30) Foreign Application Priority Data

Dec. 8, 2004 (JP) ............... 2004-355831

(51) Int. Cl.
*B62D 1/04* (2006.01)
*B62D 1/14* (2006.01)

(52) U.S. Cl. ............... 180/332; 180/335; 74/552

(58) Field of Classification Search ............... 180/332, 180/333, 335; 280/88; 74/552, 553, 543, 74/482, 486
See application file for complete search history.

(56) References Cited

U.S. PATENT DOCUMENTS

| | | | | |
|---|---|---|---|---|
| 5,555,004 | A * | 9/1996 | Ono et al. | 345/161 |
| 5,845,735 | A * | 12/1998 | Muller et al. | 180/322 |
| 6,039,142 | A * | 3/2000 | Eckstein et al. | 180/333 |
| 6,201,196 | B1 * | 3/2001 | Wergen | 200/6 A |
| 6,201,468 | B1 * | 3/2001 | DeVolpi | 338/47 |
| 6,263,753 | B1 * | 7/2001 | Froehlich | 74/482 |
| 6,412,590 | B1 | 7/2002 | Boehringer et al. | |
| 6,634,454 | B2 * | 10/2003 | Sugitani et al. | 180/402 |
| 6,655,703 | B1 * | 12/2003 | Spears, Jr. | 280/88 |
| 7,147,080 | B2 * | 12/2006 | Higashi et al. | 180/315 |
| 7,172,041 | B2 * | 2/2007 | Wuertz et al. | 180/6.24 |
| 7,178,613 | B2 * | 2/2007 | Yanaka et al. | 180/6.32 |
| 2002/0074179 | A1 * | 6/2002 | Brandt et al. | 180/252 |
| 2003/0114270 | A1 | 6/2003 | Wuertz et al. | |
| 2003/0183438 | A1 * | 10/2003 | Higashi et al. | 180/315 |

FOREIGN PATENT DOCUMENTS

| | | |
|---|---|---|
| DE | 19625498 | 6/1997 |
| JP | 49-037139 | 10/1974 |
| JP | 54-1696 | 1/1979 |
| JP | 08-034353 | 2/1996 |
| JP | 2000-052997 | 2/2000 |
| JP | 2000-118427 | 4/2000 |
| JP | 2005-170180 | 6/2005 |
| JP | 2005-225279 | 8/2005 |
| JP | 2005-225384 | 8/2005 |

* cited by examiner

*Primary Examiner*—John Q. Nguyen
*Assistant Examiner*—Joseph Rocca
(74) *Attorney, Agent, or Firm*—Carrier, Blackman & Associates, P.C.; Joseph P. Carrier; William D. Blackman (57) ABSTRACT

A vehicle control apparatus for detecting an operation amount of or an operation state quantity by an operation force on each of two independent operation elements to thereby control a steering unit based on a difference between the operation state quantities so detected.

6 Claims, 11 Drawing Sheets

VEHICLE CONTROL APPARATUS

The present invention claims foreign priority to Japanese patent application No. 2004-355831, filed on Dec. 8, 2004, the contents of which is incorporated herein by reference.

BACKGROUND OF THE INVENTION

1. Field of the Invention

The present invention relates, for example, to a vehicle control apparatus such as a steering wheel.

2. Description of the Background Art

Among steering wheels that are operated to control steering units of vehicles such as automobiles, there is proposed a steering wheel in which no repositioning of the grips thereon is required when it is operated to steer a vehicle. In this steering wheel, the steering wheel is enabled to be oscillated in addition to rotating which is its normal operation mode, so that a steering angle can also be imparted by oscillating the steering wheel so as to reduce the rotating angle of the steering wheel when operated to rotate by such an extent that the steering angle is additionally imparted by the oscillation of the steering wheel, thereby making it possible to obviate the necessity of repositioning the grips on the steering wheel when operated to rotate to steer the vehicle (for example, see Japanese Patent Unexamined Publication No. JP-A-2000-52997).

However, while the aforesaid conventional technique is advantageous in that the load exerted on the driver while driving the vehicle is reduced by eliminating the necessity of repositioning the grips on the steering wheel, in a state in which the rotating angle of the steering wheel is reduced from the conventional one in which the steering wheel is rotated through on the order of three full rotations and no large oscillating angle can be secured, since a steering angle of the steering unit that results from an amount of a single operation of the steering wheel becomes large, there is caused a problem that lots of skill is required to cope with a minute control with the steering wheel so configured.

SUMMARY OF THE INVENTION

One of the objects of the invention is to provide a vehicle control apparatus which can secure a relatively large operation amount and which is easy to operate.

With a view to attaining the object, according to a first aspect of the invention, there is provided a vehicle control apparatus comprising:

two independent operation elements (for example, control levers 3 in an embodiment);

a detecting unit detecting operation amounts of the two operation elements or an operation state quantity by an operation force on each of the two operation elements; and a control unit controlling a steering unit (for example, a steering unit 9 in the embodiment) based on a difference between the detected operation amounts or the detected operation state quantities of the operation elements.

By providing the control system that is configured as described above, relatively large operation state quantities can be secured while obviating the necessity of repositioning the grips on the steering wheel by the two operation elements that are provided independently, whereby the steering unit can be controlled by utilizing a difference between the operation state quantities.

According to a second aspect of the invention, as set forth in the first aspect of the present invention, it is preferable that the vehicle control apparatus further comprises a back-and-forth motion control unit (for example, a throttle valve 12 in the embodiment) controlling a back-and-forth motion of a vehicle, wherein the back-and-forth motion control unit is controlled in accordance with a sum of the detected operation amounts or the detected operation state quantities.

By configuring the control system as described above, the back-and-forth motion control can be implemented simultaneously with the implementation of the steering control without requiring the repositioning of the grips on the steering wheel by the two operation elements that are provided independently.

According to a third aspect of the invention, as set forth in the first aspect of the present invention, it is more preferable that the vehicle control apparatus further comprises a rotational shaft (for example, a steering shaft 40 in another embodiment) linked with the operation elements, wherein the steering unit is allowed to be controlled by rotating the operation elements around the rotational shaft.

By configuring the control system as described above, even in the event that no operation state quantities are obtained from the operation elements, a steering control intended by the controller can be implemented by physically rotating the rotational shaft via the operation elements.

According to a fourth aspect of the invention, as set forth in the first aspect of the present invention, it is furthermore preferable that the vehicle control apparatus further comprises at least one additional operation elements (for example, a steering wheel main body 67 in a further embodiment) mechanically connected to steered road-wheels, the additional operation element(s) being other than the two independent operation elements (for example, a control plate 71 in the embodiment), wherein the additional operation element(s) is/are provided in such a manner so as to be allowed to rotate relative to the operation elements.

By configuring the control system as described above, a steering control intended by the controller can be implemented by physically rotating the rotational shaft via the additional operation element, even in the event that the operation elements are not used.

According to a fifth aspect of the invention, as set forth in the second aspect of the present invention, it is preferable that the back-and-forth motion control unit increases or decreases a throttle opening of a throttle valve in accordance with the detected operation amounts or the detected operation state quantities.

According to a sixth aspect of the invention, as set forth in the second aspect of the present invention, it is preferable that the back-and-forth motion control unit controls a braking device to implement braking operation in accordance with the detected operation amounts or the detected operation state quantities.

According to a seventh aspect of the invention, as set forth in the first aspect of the present invention, it is preferable that the control unit controls a drive force distribution or a braking force distribution between left and right steered road-wheels in accordance with the detected operation amounts or the detected operation state quantities.

According to an eighth aspect of the invention, as set forth in the first aspect of the present invention, it is preferable that wherein operating directions of the two operation elements are set to be coincident with directions of rotation of a vehicle and the back-and-forth motion of the vehicle.

According to a ninth aspect of the invention, as set forth in the first aspect of the present invention, it is preferable that the detecting unit comprises a pressure sensor which detects the operating force of the operation elements.

According to a tenth aspect of the invention, as set forth in the first aspect of the present invention, it is preferable that the detecting unit comprises a rotational angle sensor which detects a rotational angle of the operation elements.

According to an eleventh aspect of the invention, as set forth in the first aspect of the present invention, it is preferable that the detecting unit detects a sliding amount of the operation elements.

According to a twelfth aspect of the invention, as set forth in the first aspect of the present invention, it is preferable that the detecting unit detects a rotational angular velocity of the operation elements.

According to a thirteenth aspect of the invention, as set forth in the first aspect of the present invention, it is preferable that the operation elements are supported to a vehicle body via elastic members.

According to a fourteenth aspect of the invention, as set forth in the fourth aspect of the present invention, it is preferable that the operation elements are supported to the at least one additional operation element via elastic members.

According to the first aspect of the invention, since relatively large operation state quantities can be secured without requiring the repositioning of the grips on the steering wheel by the two operation elements that are provided independently, so that the steering unit can be controlled using a difference between the operation state quantities so secured, a relatively large operation amount can be secured for the operation of the operation elements, and consequently, there are provided advantages that the driver is released from coping with the skill-requiring manipulation compared with a case where the driver has to control the steering unit with delicate handling and that the control is eased.

According to the second aspect of the invention, since the steering control can be implemented without requiring the repositioning of the grips on the steering wheel by the two operation elements that are provided independently and at the same time, the back-and-forth motion control can be implemented, there is provided an advantage that the steering control and the back-and-forth motion control can be implemented simultaneously only by the operation elements.

According to the third aspect of the invention, even in the event that no operation state quantities are obtained from the operation elements, since a steering control intended by the controller can be implemented by physically rotating the rotational shaft via the operation elements, there is provided an advantage that the behaviors of the vehicle can be grasped intuitively and the feel of control is improved.

According to the fourth aspect of the invention, there is provided an advantage that a steering control intended by the controller can be implemented by physically rotating the rotational shaft via the additional operation element without using the operation elements.

DETAILED DESCRIPTION OF THE PREFERRED EMBODIMENTS

Next, embodiments of the invention will be described based on the drawings.

Figure 1:
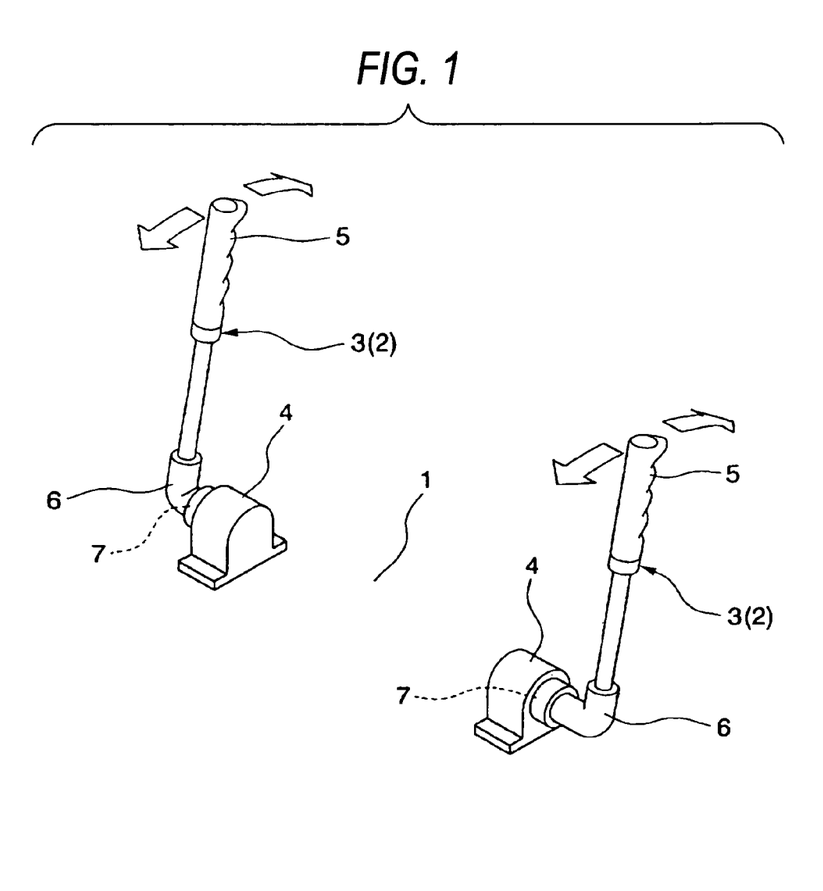
FIG. 1 is a perspective view of a first embodiment.
Figure 2:
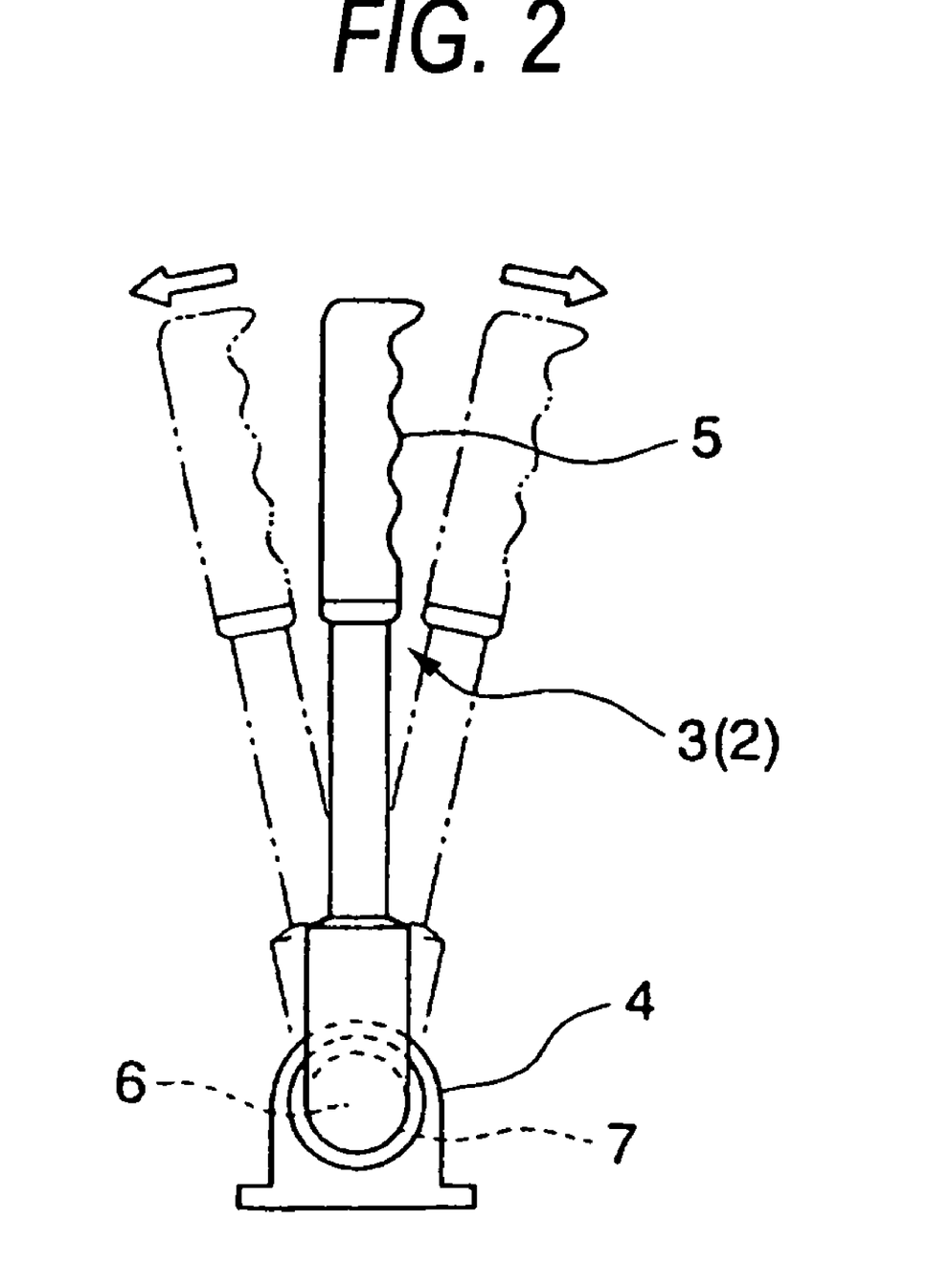
FIG. 2 is an explanatory diagram which explains the operation of the first embodiment shown in FIG. 1.

FIGS. 1, 2 show a first embodiment of the invention. As shown in FIG. 1, control devices 2 for controlling a steering unit 9 and a throttle valve (a back-and-forth motion control unit) 12, which will both be described later on, are provided on a front floor 1 at both sides of a driver seat of a vehicle.

The control devices 2 are made up of left and right independent control levers (operation elements) 3, and the control levers 3 are supported on the front floor 1 via brackets 4, respectively. It will be understood from the drawing that the left and right control levers 3 are configured and arranged so that one of the control levers may be moved independently, without requiring movement of the other control lever. To be specific, each control lever 3 is such as to be supported on the bracket 4 in such a manner as to rotate in longitudinal directions about an axis which is directed in a transverse direction of the vehicle, so that the left and right control levers 3 are operated to rotate in the longitudinal directions independently of each other by the driver who grips grip portions 5 provided at upper portions of the respective control levers 3.

A shaft portion 6 which is bent to be directed in the transverse direction is provided at a lower portion of each control lever 3, and a rotational angle sensor 7 for detecting a rotational angle (an operation amount, an operation state quantity) of the control lever 3 is provided between the shaft portion 6 and the bracket 4. The rotational angle sensor 7 is such as to detect an extent to which each control lever 3 is rotated longitudinally forwards or rearwards relative to the shaft portion 6 from a longitudinal neutral position. For example, a rotational angle can be set as being positive when the control lever 3 is rotated forwards, whereas as being negative when the control lever 3 is rotated rearwards.

Figure 3:
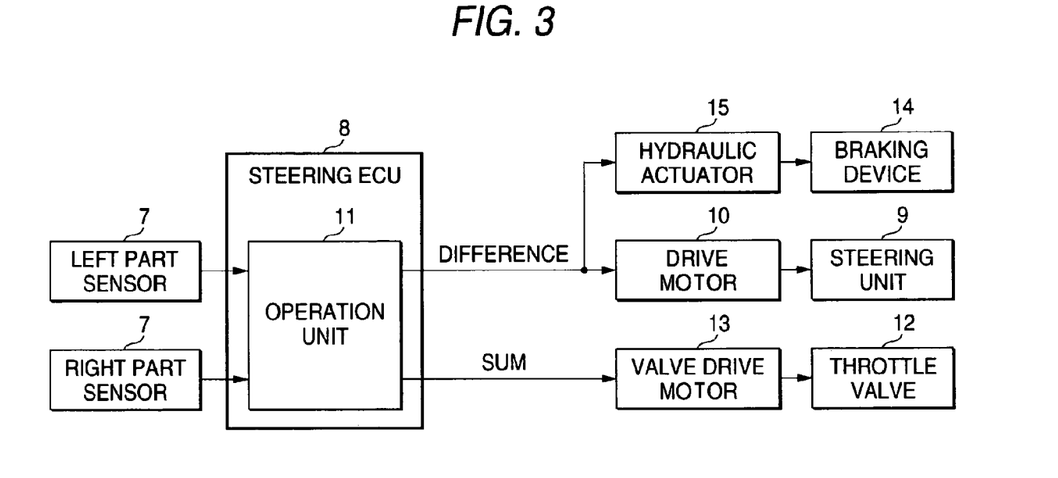
FIG. 3 is a block diagram of the embodiment.

Here, as shown in FIG. 3, a detection signal of the rotational angle sensor 7 which indicates a rotational angle of each control lever 3 is inputted into a steering ECU 8, and a drive motor 10 for the steering unit 9 is controlled to be driven in accordance with the amount of a rotational angle of each control lever 3 set from the rotational angle sensor 7.

To be specific, in the steering ECU 8, a difference between rotational angles of the respective control levers 3 is calculated at an operation unit 11, so that the drive motor 10 for the steering unit 9 is controlled to be driven based on the calculated value. Consequently, the steering unit 9 simultaneously steers steered road-wheels rightwards or leftwards by an operation amount corresponding to the difference so calculated. For example, in the event that a rotational angle of the right-hand control lever 3 is larger than a rotational angle of the left-hand control lever 3, the steering unit 9 is controlled to be driven by the drive motor 10 by an amount corresponding to a rotational angle equal to a difference between the rotational angles of the left and right control levers 3, whereby the steered road-wheels are steered leftwards.

In addition, in the event that both the control levers 3 are operated to rotate longitudinally forwards or rearwards from the neutral position, a sum of rotational angles of both the control levers 3 is calculated at the operation unit 11, so that a throttle opening of the throttle valve 12 is increased or decreased by means of a valve drive motor 13 for driving the throttle valve 12 based on the calculated value. As this occurs, in place of decreasing the throttle opening or in addition to decreasing the throttle opening, a braking operation may be made to be implemented by a braking device 14 via a hydraulic actuator 15.

Next, the function of the vehicle control apparatus according to the first embodiment will be described.

When driving the vehicle, the driver grips the grip portions 5 of the respective control levers 3 so as to operate them in the longitudinal directions independently.

When the left and right control levers 3, 3 are both rotated forwards through the same rotational angle from the neutral positions, rotational angles of the left and right control levers 3 are inputted into the steering ECU 8 by the left and right rotational angle sensors 7, 7. In the steering ECU 8, the operation unit calculates a sum of the rotational angles of the left and right control levers 3, 3 based on the rotational angles of both the control levers 3, 3, and as a result, the output of the engine is increased by opening the throttle valve 12 through a predetermined opening by driving the valve drive motor 13 based on the sum so calculated, whereby the vehicle is accelerated in a straight-ahead state.

On the contrary, when the left and right control levers 3, 3 are both rotated rearwards through the same rotational angle from the neutral positions this time, rotational angles of the respective control levers 3 are inputted into the steering ECU 8 by the left and right rotational sensors 7, 7, and in the steering ECU 8, a sum of the rotational angles of the left and right control levers 3, 3 is calculated at the operation unit 11 based on the rotational angles of both the control levers 3, so that as a result, the output of the engine is decreased by closing the throttle valve 12 through a predetermined opening by driving the valve drive motor 13 based on the sum so calculated, whereby the vehicle is decelerated in the straight-ahead state.

Next, for example, when the left and right control levers 3, 3 are both rotated forwards from the neutral positions with the right control lever 3 being rotated further forward than the left control lever 3, rotational angles of the respective control levers 3 are inputted into the steering ECU 8 by the left and right rotational sensors 7, 7. In the steering ECU 8, the operation unit 11 calculates a difference between the rotational angles of the left and right control levers 3, 3 based on the rotational angles of both the control levers 3, and as a result, the drive motor 10 is driven based on the difference so calculated, so that the steered road-wheels are steered leftwards by a predetermined amount by the steering unit 9.

In this case, in the steering ECU 8, at the same time, the operation unit 11 calculates a sum of the rotational angles of the left and right control levers 3, 3 based on the rotational angles of both the control levers 3, and as a result, the valve motor 13 is driven based on the sum so calculated so as to open the throttle valve 12 through a predetermined opening to thereby increase the output of the engine, whereby the vehicle is put in an accelerated state with the steered road-wheels steered leftwards as is described above.

In addition, for example, when the left and right control levers 3, 3 are both rotated rearwards from the neutral positions with the right control lever 3 rotated further rearwards than the left control lever 3, rotational angles of the respective control levers 3, 3 are inputted into the steering ECU 8 by the left and right rotational angle sensors 7, 7. In the steering ECU 8, the operation unit 11 calculates a difference between the rotational angles of the left and right control levers 3, 3 based on the rotational angles of both the control levers 3, and as a result, the drive motor 10 is driven based on the difference so calculated, whereby the steered road-wheels are steered rightwards by a predetermined amount by the steering unit 9.

In this case, in the steering ECU 8, at the same time, the operation unit 11 calculates a sum of the rotational angles of the left and right control levers 3, 3 based on the rotational angles of both the control levers 3, and as a result, the valve motor 13 is driven based on the sum so calculated so as to close the throttle valve 12 through a predetermined opening to thereby decrease the output of the engine, whereby the vehicle is put in a decelerated state with the steered road-wheels steered rightwards as is described above.

Here, as has been described heretofore, while the respective control levers 3, 3 are described as being both operated forwards or rearwards from the neutral positions, in the event that one control lever 3 is operated forwards from the neutral position while the other control lever 3 is operated rearwards from the neutral position, as to a difference between rotational angles, since a large difference can be obtained even in the event that operation angles of the respective control levers 3, 3 are small, as a result, a large rotating angle of the steered road-wheels can be obtained by operating the control levers 3 to a small extent in opposite directions. Consequently, it is possible to control the steering unit 9 more quickly. In addition, since a sum of the rotational angles becomes small in this case, the vehicle speed is reduced.

Note that in place of steering the steered road-wheels by the steering unit at the time of acceleration or deceleration, it is possible to steer the steered road-wheels by altering the drive force distribution or braking force distribution between the left and right steered road-wheels (this will be true in embodiments which will be described later on).

According to this embodiment, since a relatively large rotational angle difference can be secured without requiring the repositioning of the grips on the steering wheel by the two control levers 3, 3 that are provided independently and the steering unit 9 can be controlled by the drive motor 10 using the difference of the rotational angles, a relatively large operation amount of the control levers 3 can be secured, and consequently, the driver is released from coping with the skill-requiring operation compared with the case where the driver controls the steering unit 9 with a delicate handling and the control is eased.

In addition, the steering control can be implemented without requiring the repositioning of the grips on the steering wheel by the two control levers 3, 3 that are provided independently and at the same time, the acceleration and deceleration of the vehicle can be implemented by opening and closing the throttle valve 12 via the valve drive motor 13 in accordance with the sum of the rotational angles of the control levers 3, the steering control and the acceleration/deceleration control can be implemented simultaneously only by the control levers 3, 3.

Then, since the longitudinal operations are made to be implemented independently on the left and right sides and controls by the control levers 3 are made to coincide with directions of the rotation and back-and-forth motion of the vehicle, the behaviors of the vehicle can be grasped intuitively and the feel of control is improved.

Figure 4:
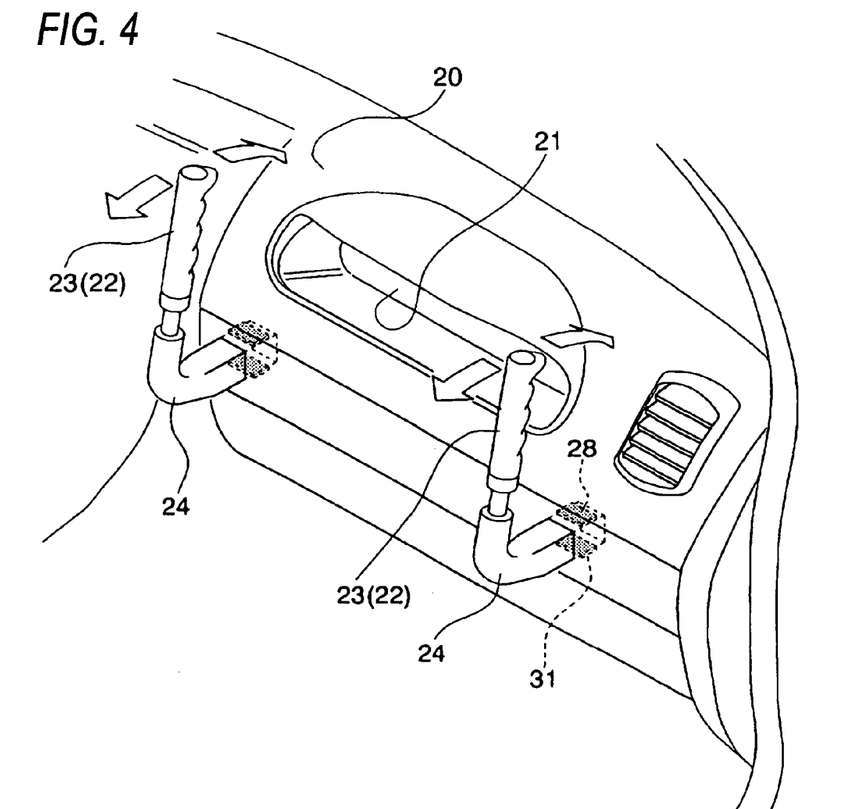
FIG. 4 is a perspective view of a second embodiment.

Next, a second embodiment of the invention will be described by reference to FIGS. 4, 5, as well as FIG. 3 (this will be true in embodiments which will be described later on). Control devices 22 of this embodiment are made up of a pair of independent control grips (operation elements) 23, 23 which are provided on an instrument panel 20 at sides of an instrument cluster portion 21 where meters and indicators are arranged, respectively.

These left and right control grips 23 are independent of each other and are configured and arranged so that one of the control grips may be moved without requiring movement of the other control grip. Each of the control grips 23 is supported on the instrument panel 20 via a substantially L-shaped arm portion 24 in such a state that the control grip 23 is restricted from rotating. To be specific, the arm portion 24 of each control grip 23 extends rearwards from the instrument panel 20 and is then bent upwards, and the control grip 23 is provided at an end of the arm portion 24 so bent, while the other end of the arm portion 24 which is inserted into the instrument panel 20 is supported on a vehicle body (not shown) via elastic members 38.

Figure 5:
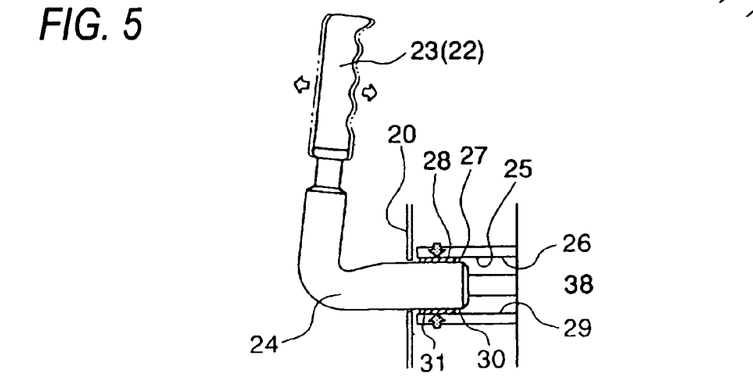
FIG. 5 is an explanatory diagram which explains the operation of the second embodiment shown in FIG. 2.

As shown in FIG. 5, an upper pressure sensor 28 is provided between an upper wall portion 26 of a through hole 25 formed through the instrument panel 20 into which the arm portion 24 is inserted and an upper wall 27 of the arm portion 24. In addition, a lower pressure sensor 31 is provided between a lower wall portion 29 of the through hole 25 and a lower wall 30 of the arm portion 24. When the control grip 23 is gripped to be pushed forwards to thereby press against the upper pressure sensor 28, the upper pressure sensor 28 is compressed, and as a result, the upper pressure sensor 28 detects an operation force (an operation state quantity) exerted on the control grip 23 in a direction in which the control grip 23 falls forwards, whereas when the control grip 23 is gripped to be pulled towards the driver to thereby press against the lower pressure sensor 31, the lower pressure sensor 31 is compressed, and as a result, the lower pressure sensor 31 detects an operation force exerted on the control grip 23 in a direction in which the control grip 23 falls rearwards.

By this configuration, the magnitude of an operation force that is being exerted on each control grip 23 to cause it to fall forwards (positive) or rearwards (negative) from a neutral position can be detected by the upper pressure sensor 28 and the lower pressure sensor 31.

In this embodiment, in place of the signals sent from the rotational sensors 7 in relation to the rotational angles of the control levers 3 in the previous embodiment, signals from the upper and lower pressure sensors 28, 31 sent therefrom in relation to operation forces exerted on the control grips 23 are inputted into the steering ECU 8, and the drive motor 10 of the steering unit 9 is controlled to be driven in accordance with the operation forces exerted on the respective control grips 23 via the steering ECU 8.

To be specific, in the steering ECU 8, a difference between the operation forces on the respective control grips is calculated at the operation unit 11, and the drive motor 10 for the steering unit 9 is driven based on the calculated value. Consequently, the steering unit 9 steers the steered road-wheels rightwards or leftwards by an amount equal to the difference in operation force so calculated. For example, in the event that the operation force causing the control grip 23 to fall forwards is larger on the left side than the right side, the steering unit 9 is controlled to be driven by the drive motor 10 so as to steer the steered road-wheels rightwards by an amount corresponding to a resulting difference in operation force.

In addition, a sum of the operation forces on the control grips 23 is calculated at the operation unit 11, so that the throttle opening of the throttle valve 12 is increased or decreased by the valve drive motor 13 for driving the throttle valve 12 based on the calculated value.

In addition to the functions and advantages provided by the first embodiment, according to this embodiment, since there exists no movable portions on the control grips 23 and the arm portions 24, and the steering control and the acceleration/deceleration control can be implemented by detecting operation forces exerted on the control grips 23 in the directions in which they are caused to fall, there can be provided an advantage that the durability of the control system can be enhanced.

Note that in this embodiment, pressure sensors may be provided at root portions between lower ends of the control grips 23 and the arm portions 24, respectively, so as to detect operation forces that are exerted on the control grips 23.

Figure 6:
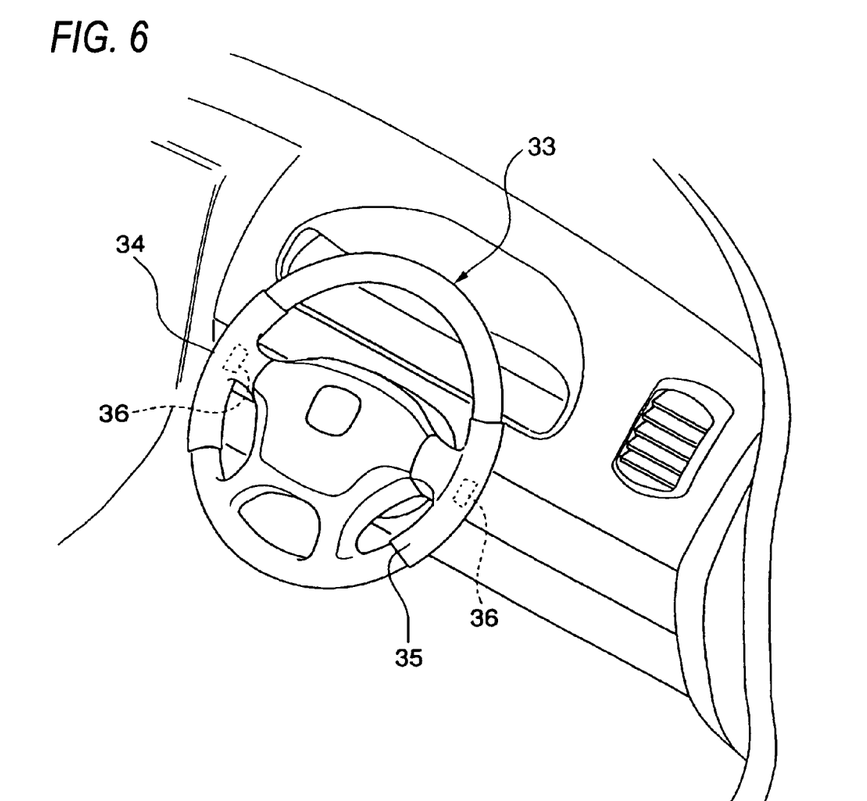
FIG. 6 is a perspective view of a third embodiment.
Figure 7:
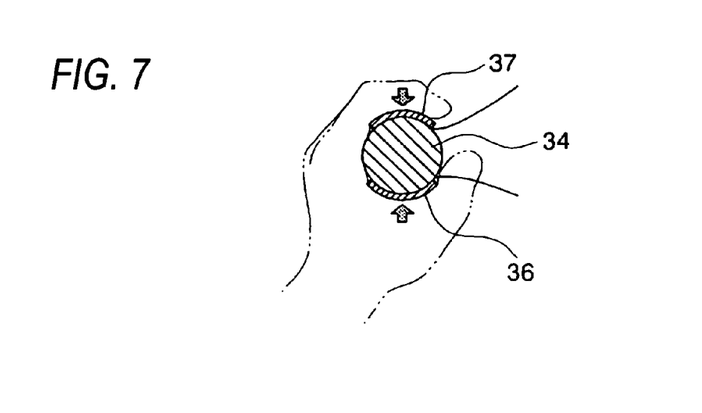
FIG. 7 is an explanatory diagram which explains the operation of the third embodiment shown in FIG. 6.

FIGS. 6, 7 show a third embodiment of the invention. While a control system 32 of this embodiment externally looks as a normal steering wheel 33, pressure sensors 36, 37 are provided underneath an upper or front surface and a rear surface of a left grip portion (a operation element) 34 and a right grip portion (a operation element) of the steering wheel, 33 independently on left and right sides of the steering wheel 33. Specifically speaking, the front pressure sensor 36 is provided on the front surface of the right grip portion 35 and the rear pressure sensor 37 is provided on the rear surface thereof, while the front pressure sensor 36 is provided on the front surface of the left grip portion 34 and the rear pressure sensor 37 is provided on the rear surface thereof.

When the left and right grip portions 34, 35 are gripped to be pushed forwards to thereby press against the respective front pressure sensors 36, 36, the front pressure sensors are compressed, and as a result, the front pressure sensors 36, 36 detect operation forces exerted forwards on the respective grip portions 34, 35, whereas when the left and right grip portions 34, 35 are gripped to be pulled towards the driver to thereby press against the respective rear pressure sensors 37, 37, the rear pressure sensors 37, 37 are compressed, and as a result, the rear pressure sensors 37, 37 detect operation forces exerted rearwards on the respective grip portions 34, 35.

By this configuration, the magnitude of operation forces that are being exerted on the respective grip portions 34, 35 to cause them to move forwards (positive) or rearwards (negative) from a neutral position where no operation force is exerted thereon can be detected by the front pressure sensors 36, 36 and the rear pressure sensors 37, 37.

As with the previous embodiments, also in this embodiment, signals on the operation force are inputted into the steering ECU 8, so that the drive motor 10 for the steering unit 9 is controlled to be driven in accordance with the operation force exerted on the respective grip portions 34, 35 via the steering ECU 8.

Specifically speaking, a difference between operation forces exerted on the respective grip portions 34, 35 is calculated at the operation unit 11 in the steering ECU 8, and the drive motor 10 for the steering unit 9 is controlled to be driven based on the calculated value. Consequently, the steering unit 9 steers rightwards or leftwards the steered road-wheels by an amount equal to an operation force resulting as the difference so calculated. For example, in the event that the operation force exerted on the right grip portion 35 is larger than the operation force exerted on the left grip portion 34, the steering unit 9 is controlled to be driven by the drive motor 10 so as to steer rightwards the steered road-wheels by an amount according to an operation force resulting as a difference between the operation forces. In addition, a sum of the operation forces on the grip portions 34, 35 is calculated at the operation unit 11, whereby the throttle opening of the throttle valve 12 is increased or decreased by the valve drive motor 13 for driving the throttle valve 12 based on the calculated value.

In addition to the basic functions and advantages of the previous embodiments, according to this embodiment, since the steering wheel 33 is formed into the same shape as that of the conventional one, there is provided an advantage that the steering wheel 33 can be used without causing the driver to feel a sensation of physical disorder. Note that this control system 32 may be incorporated into a normal steering wheel which can be steered.

Figure 8:
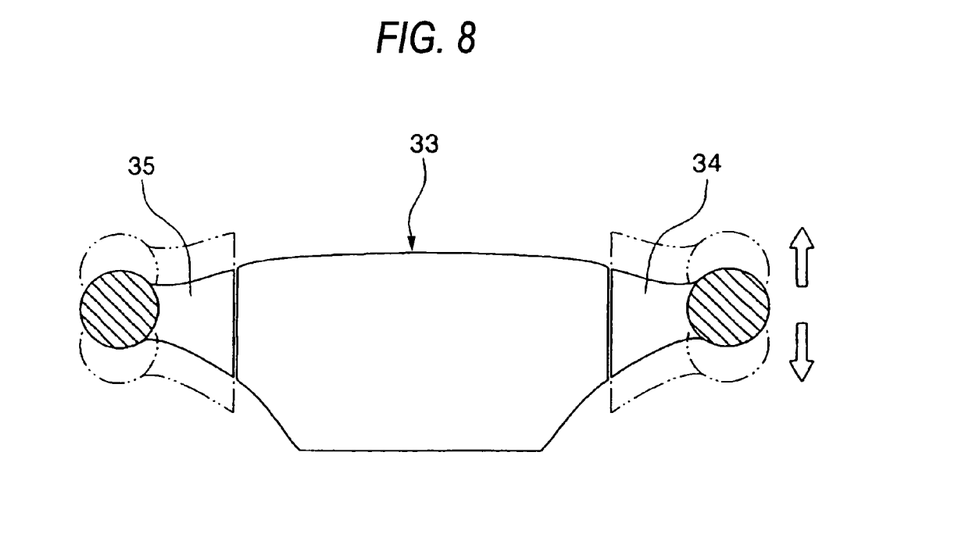
FIG. 8 is an explanatory diagram which shows another form of the third embodiment.

Here, in the third embodiment that has just been described above, while the front pressure sensors 36 are such as to detect the operation forces exerted forwards on the left and right grip portions 34, 35 when the left and right grip portions 34, 35 are gripped to be pushed forwards to thereby press against the front pressure sensors 36, and the rear pressure sensors 37 are such as to detect the operation forces exerted rearwards on the left and right grip portions 34, 35 when the left and right grip portions 34, 35 are gripped to be pulled towards the driver to thereby press against the front pressure sensors 37, the respective grip portions 34, 35 of the steering wheel 33 may be, as shown in FIG. 8, configured so as to slide in longitudinal directions, so that slide amounts (operation amounts, operation state quantities) can be detected independently by the left and right grip portions 34, 35, whereby the steering unit 9 may be controlled via the drive motor 10 based on a difference in the slide amounts or the throttle valve 12 may be controlled to be opened or closed via the valve drive motor 13 based on a sum of the slide amounts of the respective grip portions 34, 35.

Figure 9:
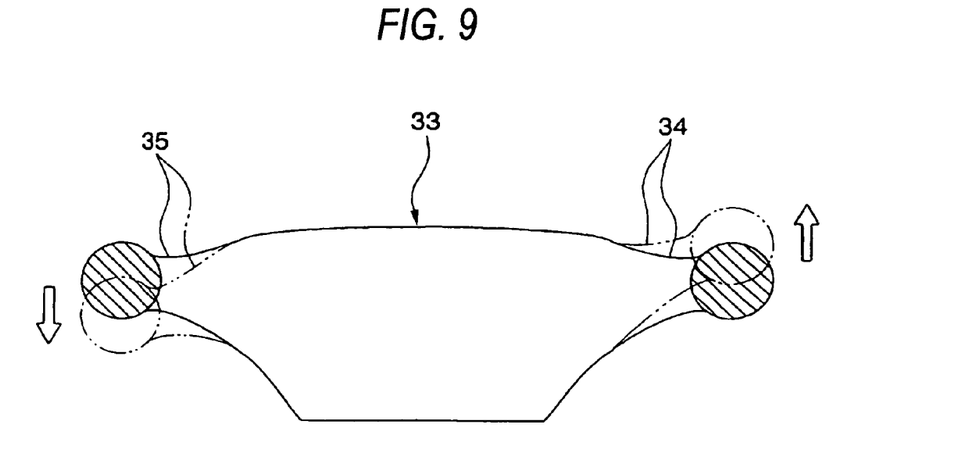
FIG. 9 is an explanatory diagram which shows a further form of the third embodiment.

In addition, as shown in FIG. 9, the left and right grip portions 34, 35 of the steering wheel 33 may be configured so as to be partially flexible, and pressure sensors, not shown, are incorporated in the respective grip portions 34, 35 so as to detect a rearward deformation or a forward deformation of the grip portions 34, 35 to thereby control the steering unit 9 and the throttle valve 12.

Figure 10:
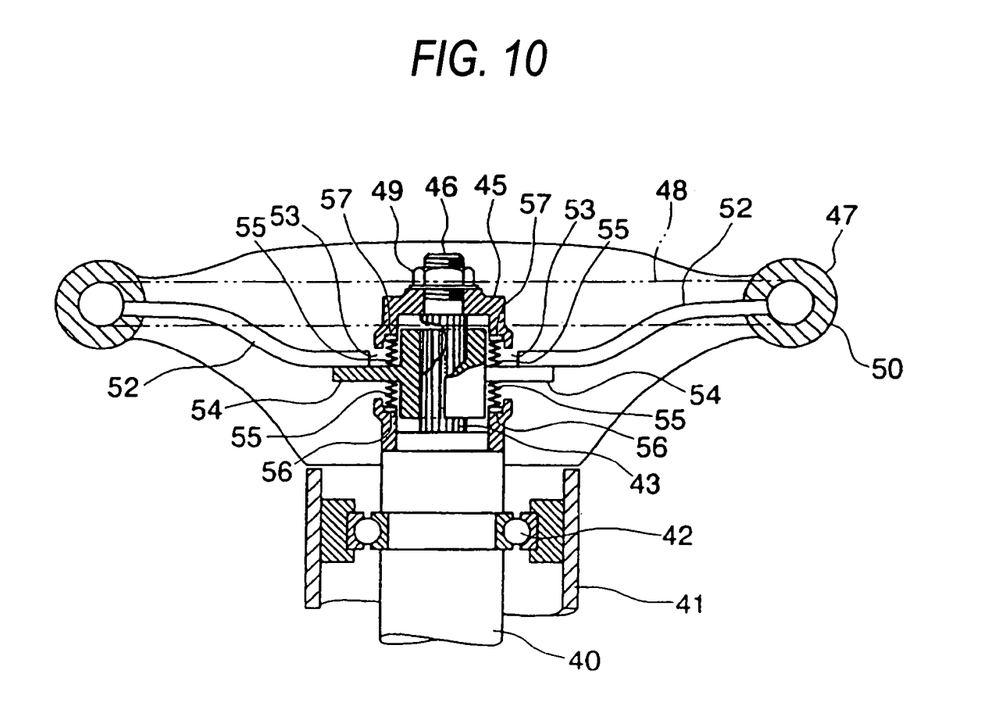
FIG. 10 is a vertical sectional view of a fourth embodiment.
Figure 11:
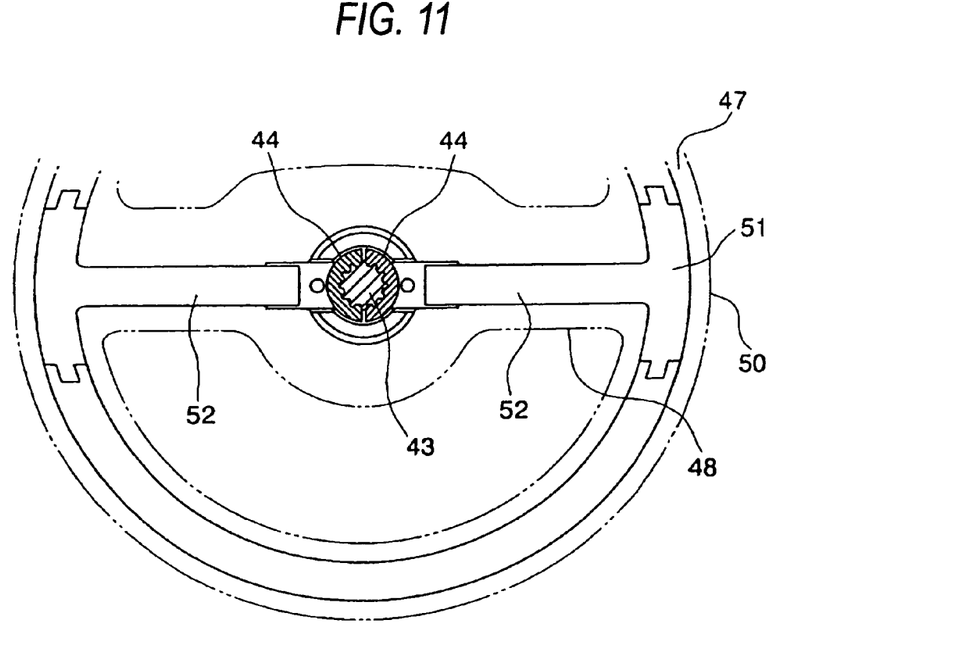
FIG. 11 is a horizontal sectional view of the fourth embodiment.
Figure 12:
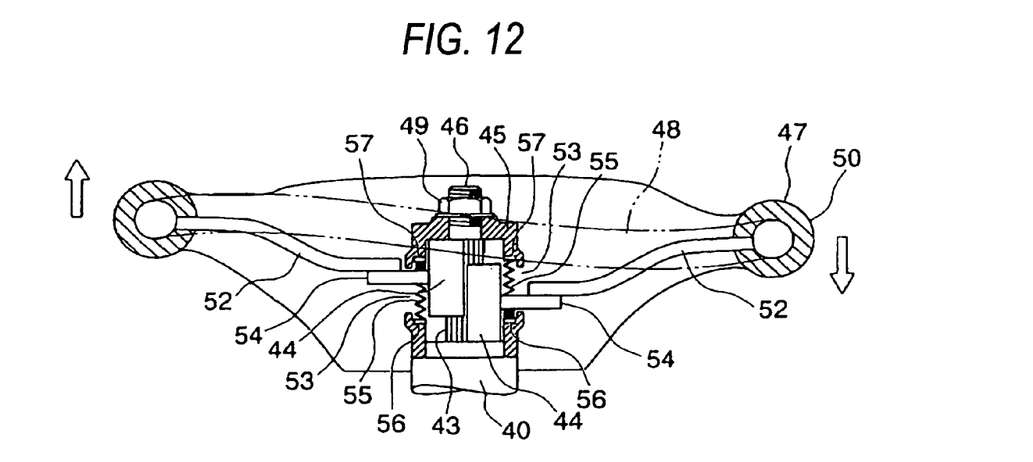
FIG. 12 is an explanatory diagram which explains the operation of the fourth embodiment shown in FIG. 10.

Next, a fourth embodiment of the invention will be described based on FIGS. 10 to 12.

A steering shaft (a rotational shaft) 40 is connected to the steered road-wheels, not shown, via the steering unit 9, and this steering shaft 40 is rotatably supported on an outer tube 41 supported on the vehicle body via a bearing 42.

A male spline 43 is formed on an upper end portion of the steering shaft 40. As shown in FIG. 11, a pair of halved female splines (operation elements) 44, 44 are disposed around the periphery of the male spline 43, and the female splines 44, 44 are assembled on to the male spline 43 in such a manner as to be brought into engagement with the male spline 43 in a rotational direction while allowed to slide longitudinally with a certain stroke secured. The female splines 44, 44 are covered by a cap 45 on an outside thereof, and an externally threaded portion 46 formed on a distal end portion of the male spline 43 protrudes from an apex portion of the cap 45.

Then, a spoke portion (an operation element) 48 of a steering wheel main body (an operation element) 47, which is disposed in a transverse direction of the vehicle where a steering wheel is at its neutral position, is fastened to be fixed to the externally threaded portion 46 by a nut 49. Here, the spoke portion 48 is formed of an elastic resin material in such a manner as to extend across an annular portion 50 of the steering wheel main body 47, and left and right end portions thereof are made to be displaced back and forth independently. Proximal portions of metallic input arms (operation elements) 52 which extend towards the center of the annular portion 50 are connected, respectively, to embedded brackets 51 provided in the steering wheel main body 47 on left and right sides thereof.

On the other hand, a pair of left and right openings 53 are provided in an outer circumference of the cap 45 at positions corresponding to extending end portions of the input arms 52, and mounting pieces 54 which are mounted on outer circumferential walls of the female splines 44 are made to protrude from the openings 53, respectively. The mounting pieces 54 are fixedly connected to extending ends of the input arms 52, respectively.

Here, the mounting pieces 54 protrude from vertically central portions of the openings 53, and coil springs 55, 55 are interposed between each of the mounting piece 54 and upper and lower edges of each of the openings 53. The female splines 44 are held at neural positions by the coil springs 55 via the mounting pieces 54. Then, pressure sensors 56, 57 are provided between the coil springs 55 and the upper and lower edges of the openings 53. To be specific, the front pressure sensors 56 are provided below the left and right mounting pieces 54, whereas the rear pressure sensors 57 are provided above the left and right mounting pieces 54.

Namely, when the left and right sides of the annular portion 50 of the steering wheel main body 47 are gripped to be pushed to thereby press against the front pressure sensors 56, the front pressure sensors 56 are compressed, and as a result, the front pressure sensors 56 detect operation forces exerted forwards on the steering wheel main body 47, whereas when the left and right sides of the annular portion 50 of the steering wheel main body 47 are gripped to be pulled towards the driver to thereby press against the rear pressure sensors 57, the rear pressure sensors 57 are compressed, and as a result, the rear pressure sensors 57 detect operation forces exerted rearwards on the steering wheel main body 47.

By this configuration, the magnitude of an operation force that is being exerted on the steering wheel main body 47 to cause it to move forwards (positive) or rearwards (negative) from a neutral position thereof where no operation force is exerted thereon can be detected by the front pressure sensors 56 and the rear pressure sensors 57. Of course, since the spoke portion 48 deforms, one of the female splines 44 can operate back and forth independently of the other female spline 44 as shown in FIG. 12.

In this embodiment, signals on the operation forces are inputted into the steering ECU 8, so that the drive motor 10 for the steering unit 9 is controlled to be driven in accordance with the operation forces exerted via the left and right female splines 44, 44.

Specifically speaking, in the steering ECU 8, a difference between the left and right operation forces exerted via the left and right female splines 44, 44 is calculated at the operation unit 11, and the drive motor 10 for the steering unit 9 is driven based on the calculated value. In addition, a sum of both the operation forces is calculated at the operation unit 11, and the throttle opening of the throttle valve 12 is increased or decreased based on the calculated value by the valve motor 13 for driving the throttle valve 12.

Then, when the annular portion 50 of the steering wheel main body 47 is rotated, since a rotational force exerted thereon is transmitted to the left and right female splines 44, 44 via the input arms 52, whereby the male spline 43 is rotated in turn, the steered road-wheels are mechanically steered by the rotating steering shaft 40 via the steering unit 9.

As with the previously described embodiments, according to this embodiment, since a relatively large difference in operation force can be secured without requiring the repositioning of the grips on the steering wheel main body mainly by the two input arms 52, 52 and associated female splines 44, 44 which are provided to function independently of each other and the steering unit 9 can be controlled by the drive motor 10 using the difference in operation force so secured, the control is eased compared with the case where the steering unit 9 is controlled with a delicate handling.

In addition, since the steering control can be implemented without requiring the repositioning of the grips on the steering wheel main body by the two input arms 52, 52 and associated female splines 44, 44 which are provided to function independently of each other and at the same time, the acceleration and deceleration of the vehicle can be implemented by opening and closing the throttle valve 12 via the valve drive motor in accordance with the sum of the operation forces, the steering control and the acceleration/deceleration control can be implemented simultaneously with the steering wheel main body 47 kept gripped.

Above all, this embodiment is advantageous in that the steering unit 9 can be mechanically controlled by rotating the steering shaft 40 even when the steering wheel main body 47 is rotated.

Figure 13:
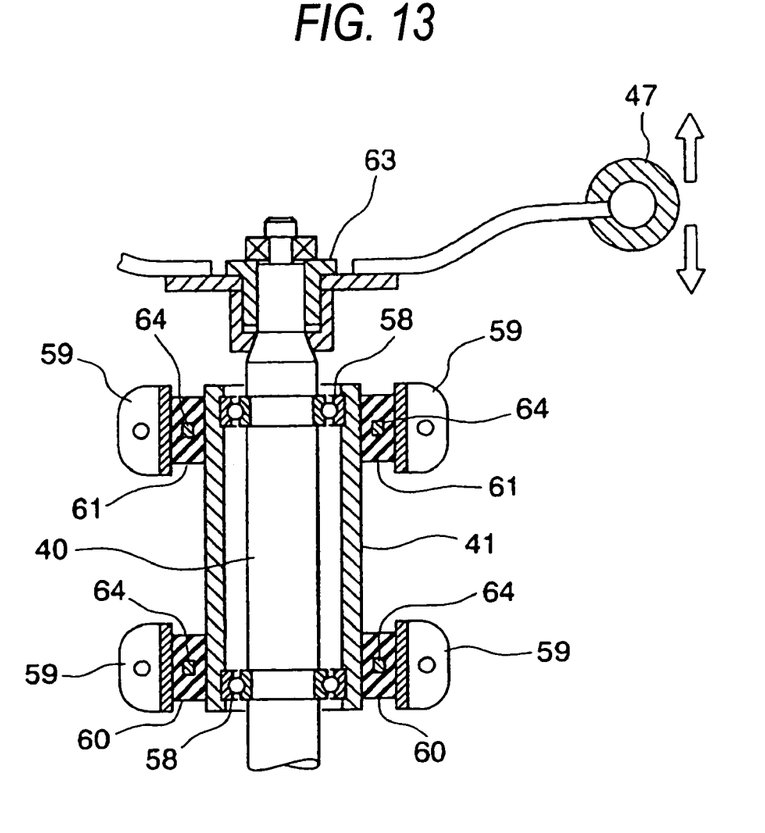
FIG. 13 is a vertical sectional view of another form of the fourth embodiment.
Figure 14:
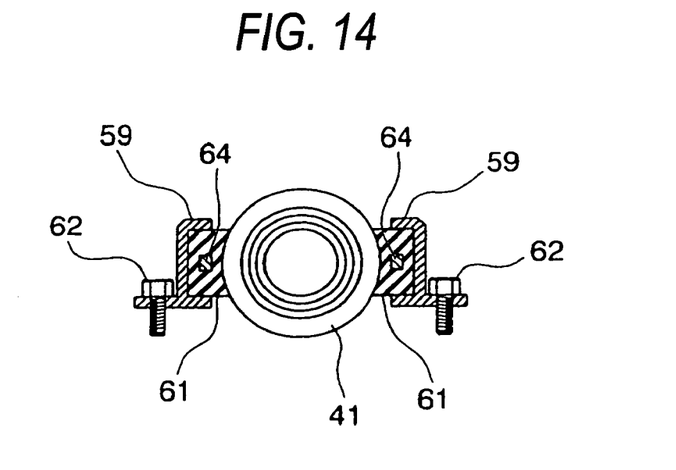
FIG. 14 is a horizontal sectional view of the form in FIG. 13.
Figure 15:
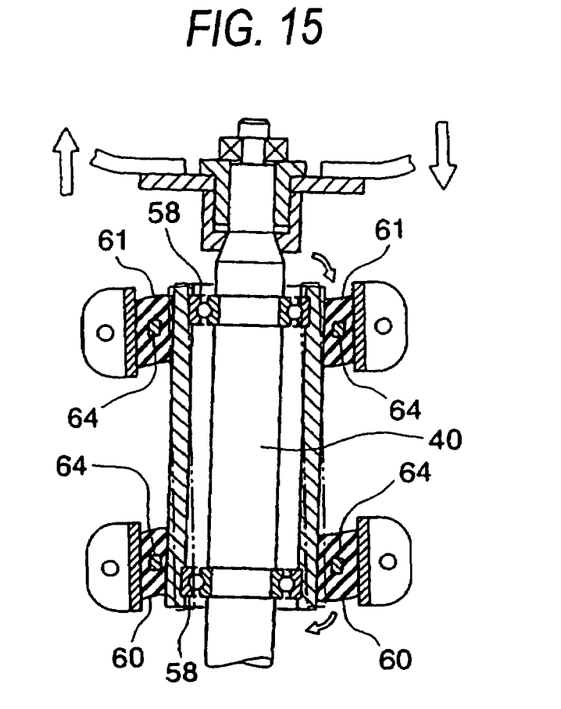
FIG. 15 is an explanatory diagram which explains the operation of the form.

Here, while in the previously described embodiments, the steering unit 9 and the throttle valve 12 are controlled by pushing the annular portion 50 of the steering wheel main body 47 forwards or rearwards independently on the left and right sides thereof, a configuration as shown in FIGS. 13 to 15 may be adopted in which an outer tube 41 which supports rotatably the steering shaft 40 via a pair of bearings 58, 58 is supported on the vehicle body via brackets 59.

In this embodiment, a pair of lower elastic members 60, 60 and a pair of upper elastic members 61, 61 are provided on left and right sides of outer circumferential portions of a lower end portion and an upper end portion of the outer tube 41 which correspond to locations on the outer tube 41 where the bearings 58 are provided. Here, pressure sensors 64 are embedded in the interior of the lower elastic members 60 and the upper elastic members 61. The brackets 59 are formed integrally with the lower elastic members 60, 60 and the upper elastic members 61, 61, and each bracket 59 is mounted on the vehicle body with a bolt 62, whereby the upper end portion and the lower end portion of the steering shaft 40 are supported in such a manner as to tilt to the left and right. Note that the steering wheel main body 47 is fixedly fastened to a distal end of the steering shaft 40 with a nut 63.

In this configuration, when the steering shaft 40 tilts, as shown in FIG. 15, to the right at the upper end portion and to the left at the lower end portion thereof in such a state that the steering shaft 40 is restrained on the outside thereof by the respective brackets 59 that are fixed to the vehicle body, the left upper elastic member 61 is compressed, whereas the right upper elastic member 61 is stretched, and the left lower elastic member 60 is stretched and the right lower elastic member 60 is compressed. Note that in this case, the steering shaft 40 may be tilted not at both the lower and upper end portions as has been described above but at one of the lower and upper end portions to the left or right.

By configuring the control system as has just been described above, the control of the steering unit 9 is eased since the steering unit 9 can be controlled by the drive motor 10 utilizing a difference or differences in operation force between the left and right sides of one or both of the upper and lower end portions of the outer tube 41 which results via the pressure sensors 64 in the pair of lower elastic members 60, 60 and the pair of upper elastic members 61, 61 which are provided independently of each other from tilting the outer tube 41 at only one or both of the upper and lower end portions thereof. In addition, since the acceleration and deceleration of the vehicle can be implemented by opening and closing the throttle valve 12 via the valve drive motor 13 in accordance with a sum of the operation forces, the steering control and the acceleration/deceleration control of the vehicle can be implemented simultaneously with the steering wheel main body 47 kept gripped.

Above all, the embodiment is also advantageous in that the steering unit 9 which is physically connected to the steering wheel main body 47 can be controlled when the steering wheel main body 47 is rotated.

Figure 16:
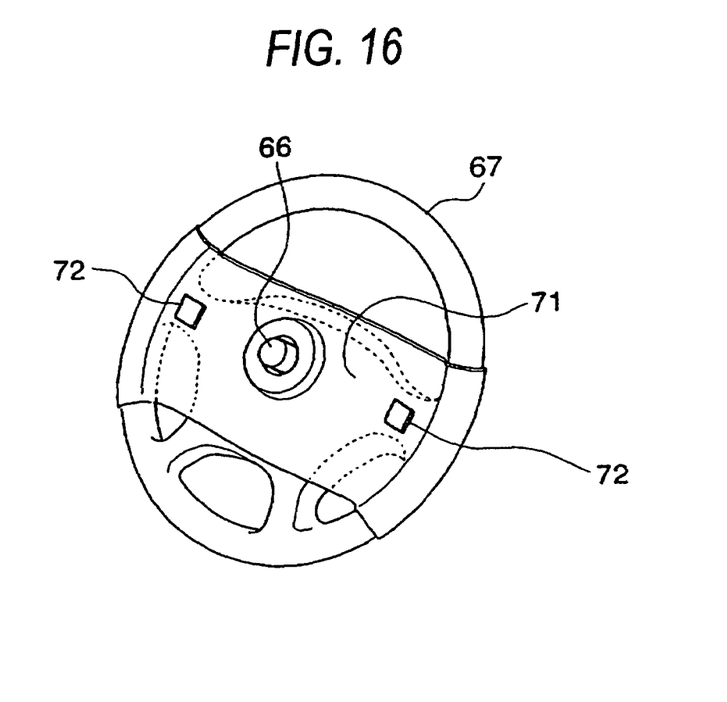
FIG. 16 is a perspective view of a fifth embodiment.
Figure 17:
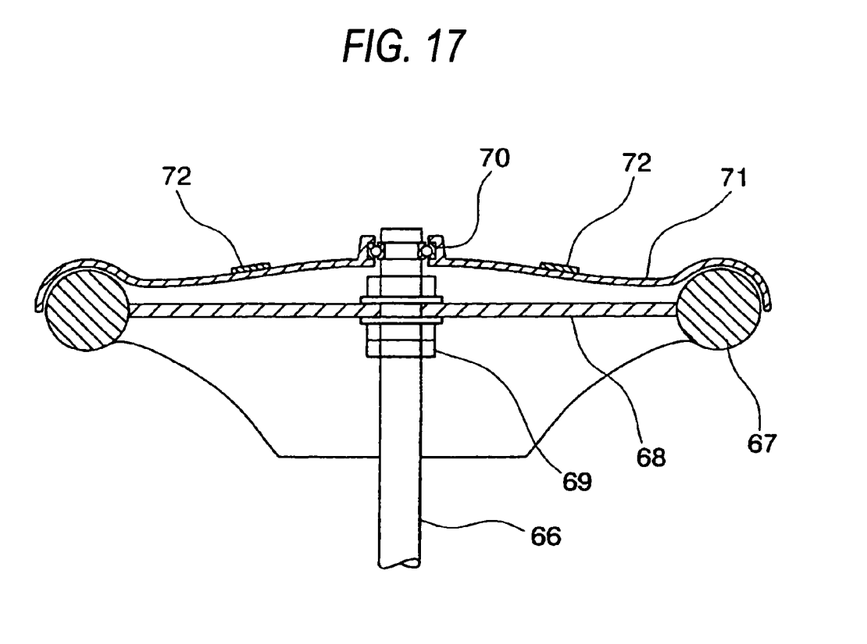
FIG. 17 is a vertical sectional view of the fifth embodiment.

Next, a fifth embodiment of the invention will be described based on FIGS. 16, 17.

A steering shaft 66 is mechanically connected to the steered road-wheels, not shown, via the steering unit 9, and a spoke portion 68 of a steering main body (a additional operation element) 67 is fixed to the steering shaft 66 with a nut member 69.

A bearing 70 is fitted on a distal end of the steering shaft 66, and a control plate (a operation element) 71, which extends like a belt transversely across the steering wheel main body 67 and which can elastically deform in a longitudinal (planar) direction independently on the left and right thereof, is mounted on the steering wheel main body 67 via the bearing 70 in such a manner as to rotate relative to the steering wheel main body 67.

Both side portions of the control plate 71 are formed into an arc shape so as to follow an outer circumference of the steering wheel main body 67 and are supported so as to slide along the outer circumference of the steering wheel main body 67, and the steering wheel main body 67 and the steering shaft 66 are made to be able to rotate with the control plate 71 kept at the aforesaid position. Then, a pair of pressure sensors 72, 72 are mounted at left and right positions on the control plate 71.

When pressed forwards with the steering wheel main body 67 kept gripped, the respective pressure sensors 72, 72 detect operation forces exerted forwards on the steering wheel main body 67.

By this configuration, the magnitude of an operation force exerted on the left pressure sensor 72 or the right pressure sensor 72 to move it from its neutral position where no operation force is exerted on the steering wheel main body 67 can be detected.

In this embodiment, signals on operation forces are inputted into the steering ECU 8, so that the drive motor 10 for the steering unit 9 is controlled to be driven, via the steering ECU 8, in accordance with operation forces transmitted to the left and right pressure sensors 72, 72.

To be specific, in the steering ECU 8, a difference between operation forces exerted on the left and right of the steering wheel main body 67 is calculated at the operation unit 11, and the drive motor 10 for the steering unit 9 is driven based on the calculated value. In addition, a sum of both the operation forces is calculated at the operation unit 11, and the throttle opening of the throttle valve 12 is increased or decreased by the valve drive motor 13 for driving the throttle valve 12 based on the calculated value.

Then, when the steering wheel main body 67 is rotated, the steering shaft 66 is rotated with the control plate 71 remaining at its designed position, whereby the steered road-wheels are mechanically steered via the steering unit 9. On the other hand, when a steer is implemented by operating the control plate 71, the steering wheel main body 67 rotates in conjunction therewith.

As with the respective embodiments that have been described previously, according to the embodiment, since a relatively large difference in operation force can be secured without requiring the repositioning of the grips on the steering wheel main body 67 and the steering unit 9 can be controlled by the drive motor 10 utilizing the difference in operation force so secured, the control is eased, and since even the acceleration of the vehicle can be implemented by opening the throttle valve 12 via the valve drive motor 13 in accordance with the sum of operation forces, the steering control and the acceleration control of the vehicle can implemented simultaneously with the steering wheel main body 67 kept gripped. In addition, the embodiment is advantageous in that even in the event that the steering wheel main body 67 is rotated, the steering unit 9 can be controlled as normally.

The invention is not limited to the embodiments that have been described heretofore. For example, while the rotational angle and the rotational force which constitute the operation amount are described as being used as the operation state quantity, a rotational angular velocity may be used in place of the rotational angle and force or the rotational angular velocity may be used in addition to the rotational angle and force, whereby a control can be realized which reflects intentions of the driver to accelerate and decelerate the vehicle.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle control apparatus comprising:
   a steering unit;
   two independent operation elements configured to steer the vehicle and arranged so that one of said operation elements is operable to move without requiring movement of the other operation element;
   a detecting unit which detects operation amounts of the two operation elements or an operation state quantity by an operation force on each of the two operation elements;
   a control unit which controls the steering unit based on a difference between the detected operation amounts or the detected operation state quantities of the operation elements; and
   at least one additional operation element mechanically connected to steered road-wheels for steering the road-wheels, the at least one additional operation element being separate from the two independent operation elements,
   wherein the at least one additional operation elements is provided in such a manner so as to be allowed to rotate relative to the independent operation elements.

2. The vehicle control apparatus as set forth in claim 1, further comprising a back-and-forth motion control unit controlling a back-and-forth motion of a vehicle,
   wherein the back-and-forth motion control unit is controlled by the control unit in accordance with a sum of the detected operation amounts or the detected operation state quantities; and
   wherein said back-and-forth motion control unit jointly controls rotation of steered road-wheels of a vehicle.

3. The vehicle control apparatus as set forth in claim 1, wherein the control unit controls both a drive force distribution and a braking force distribution between left and right steered road-wheels, and a steering direction, in accordance with the detected operation amounts or the detected operation state quantities.

4. The vehicle control apparatus as set forth in claim 1, wherein operating directions of the two independent operation elements are set to coincide with directions of rotation of a vehicle and the back-and-forth motion of the vehicle.

5. The vehicle control apparatus as set forth in claim 1, wherein the detecting unit comprises a pressure sensor which detects the operating force of the independent operation elements.

6. A vehicle control apparatus comprising:
   a steering unit;
   two independent operation elements configured to steer the vehicle and arranged so that one of said operation elements is operable to move without requiring movement of the other operation element;
   a detecting unit which detects operation amounts of the two operation elements or an operation state quantity by an operation force on each of the two operation elements;
   a control unit which controls the steering unit based on a difference between the detected operation amounts or the detected operation state quantities of the operation elements; and
   a steering wheel,
   said two independent operation elements are provided with said steering wheel, and said steering wheel can be manipulated to steer road wheels of the vehicle apart from operation of said two independent operation elements.

* * * * *